US011155307B2

United States Patent
Ikeda et al.

(10) Patent No.: US 11,155,307 B2
(45) Date of Patent: Oct. 26, 2021

(54) FRONT PILLAR STRUCTURE

(71) Applicant: TOYOTA JIDOSHA KABUSHIKI KAISHA, Aichi-ken (JP)

(72) Inventors: Koki Ikeda, Toyota (JP); Shinya Kamimura, Toyota (JP); Yoshiki Miyamoto, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 100 days.

(21) Appl. No.: 16/660,801

(22) Filed: Oct. 23, 2019

(65) Prior Publication Data
US 2020/0148273 A1 May 14, 2020

(30) Foreign Application Priority Data
Nov. 13, 2018 (JP) .............................. JP2018-213295

(51) Int. Cl.
*B62D 25/04* (2006.01)
(52) U.S. Cl.
CPC .................................. *B62D 25/04* (2013.01)
(58) Field of Classification Search
CPC ..................................................... B62D 25/04
USPC .............................. 296/193.06, 96.18, 96.21
See application file for complete search history.

(56) References Cited

U.S. PATENT DOCUMENTS

| 2002/0109370 | A1* | 8/2002 | Lagrue | B29C 53/063 296/96.21 |
|---|---|---|---|---|
| 2016/0368537 | A1 | 12/2016 | Toyota | |
| 2017/0183039 | A1 | 6/2017 | Toyota et al. | |
| 2017/0240122 | A1* | 8/2017 | Terada | B62D 29/043 |
| 2018/0273103 | A1 | 9/2018 | Komoriya et al. | |

FOREIGN PATENT DOCUMENTS

| EP | 3511230 A1 | 7/2019 |
|---|---|---|
| GB | 2479363 A | 10/2011 |
| JP | 2003-276638 A | 10/2003 |
| JP | 2006273057 A | 10/2006 |
| JP | 2013-184659 A | 9/2013 |
| JP | 2017-7509 A | 1/2017 |
| JP | 2017-114410 A | 6/2017 |

* cited by examiner

*Primary Examiner* — Dennis H Pedder
(74) *Attorney, Agent, or Firm* — Hauptman Ham, LLP

(57) ABSTRACT

A front pillar structure has: a front side pillar frame member and a rear side pillar frame member that structure a front pillar disposed at a vehicle transverse direction outer side of a front windshield glass; a transparent member that extends between the front side pillar frame member and the rear side pillar frame member, and that is disposed along a direction intersecting the front windshield glass; a planar portion that is formed at the front side pillar frame member so as to face toward a vehicle front side, and to which a vehicle transverse direction outer side end portion of the front windshield glass is mounted from a vehicle front side; and an angle absorbing member that is provided at a vehicle front side end portion of the transparent member, and that is mounted to the planar portion from the vehicle front side.

9 Claims, 5 Drawing Sheets

FRONT PILLAR STRUCTURE

CROSS-REFERENCE TO RELATED APPLICATION

This application is based on and claims priority under 35 U.S.C. 119 from Japanese Patent Application No. 2018-213295 filed on Nov. 13, 2018, the disclosure of which is incorporated by reference herein.

BACKGROUND

Technical Field

The present disclosure relates to a front pillar structure.

Related Art

There are conventionally known structures in which a front pillar is formed from a front portion front pillar, a rear portion front pillar, and a sub-window glass therebetween, and the vehicle transverse direction outer side end portion of the front window glass and the front end portion of the sub-window glass are mounted to a frame member that structures the front portion front pillar (see, for example, Japanese Patent Application Laid-Open (JP-A) No. 2003-276638).

However, at the frame member of the above-described structure, a first surface to which the vehicle transverse direction outer side end portion of the front window glass is mounted, and a second surface to which the front end portion of the sub-window glass is mounted, are disposed along directions that intersect one another as seen in a plan view. (The first surface faces toward the vehicle front side, and the second surface faces toward the vehicle transverse direction outer side.)

Therefore, when the front pillar is viewed from the driver's seat or from the front passenger's seat, there is the inconvenience that the width of the front portion front pillar, i.e., the dead angle, is relatively large.

SUMMARY

Thus, an object of the present disclosure is to provide a front pillar structure in which narrowing of a front pillar is devised and the dead angles that arise due to the front pillar can be reduced.

In order to achieve the above-described object, a front pillar structure of a first aspect of the present disclosure has: a front side pillar frame member and a rear side pillar frame member that structure a front pillar that is disposed at an outer side, in a vehicle transverse direction, of a front windshield glass; a transparent member that extends between the front side pillar frame member and the rear side pillar frame member, and that, as seen in a plan view, is disposed along a direction intersecting the front windshield glass; a planar portion that is formed at the front side pillar frame member so as to face toward a vehicle front side, and to which an outer side end portion, in the vehicle transverse direction, of the front windshield glass is mounted from a vehicle front side; and an angle absorbing member that is provided at a vehicle front side end portion of the transparent member, and that is mounted to the planar portion from the vehicle front side.

In accordance with the first aspect of the present disclosure, the vehicle front side end portion of the transparent member is mounted, from the vehicle front side and via the angle absorbing member, to the planar portion to which the vehicle transverse direction outer side end portion of the front windshield glass is mounted from the vehicle front side. Namely, the vehicle transverse direction outer side end portion of the front windshield glass and the vehicle front side end portion of the transparent member are respectively mounted to the same planar portion that faces toward the vehicle front side. Accordingly, as compared with a case in which the vehicle transverse direction outer side end portion of the front windshield glass and the vehicle front side end portion of the transparent member are mounted to a surface that faces toward the vehicle front side and a surface that faces toward the vehicle transverse direction outer side respectively, narrowing of the front side pillar frame member is devised, and, as a result, narrowing of the front pillar is devised. Accordingly, the dead angles that arise due to the front pillar are reduced.

A front pillar structure of a second aspect of the present disclosure is the front pillar structure of the first aspect, wherein the angle absorbing member, as seen in a plan view, is formed substantially in a shape of a right triangle having a right angle portion that is disposed at an inner side, in the vehicle transverse direction, and at a vehicle rear side.

In accordance with the second aspect of the present disclosure, the angle absorbing member is, as seen in a plan view, formed substantially in the shape of a right triangle whose right angle portion is disposed at the vehicle transverse direction inner side and the vehicle rear side. Accordingly, even though the transparent member is disposed along a direction intersecting the front windshield glass as seen in a plan view, the vehicle front side end portion of the transparent member is mounted well to the planar portion that faces toward the vehicle front side.

A front pillar structure of a third aspect of the present disclosure is the front pillar structure of the first or second aspect, wherein the angle absorbing member has a positioning portion for positioning with respect to the planar portion.

In accordance with the third aspect of the present disclosure, the angle absorbing member has the positioning portion for positioning with respect to the planar portion. Accordingly, as compared with a structure in which a positioning member for positioning with respect to the planar portion is provided separately, a reduction in the number of parts is devised, and the angle absorbing member is mounted accurately.

As described above, in accordance with the present disclosure, narrowing of the front pillar can be devised, and the dead angles that arise due to the front pillar can be reduced.

BRIEF DESCRIPTION OF THE DRAWINGS

An exemplary embodiment of the present disclosure will be described in detail based on the following figures, wherein.

DETAILED DESCRIPTION

An embodiment relating to the present disclosure is described in detail hereinafter on the basis of the drawings. Note that, for convenience of explanation, arrow UP that is shown appropriately in the respective drawings indicates the vehicle upward direction, arrow FR indicates the vehicle forward direction, and arrow RH indicates the vehicle rightward direction. Accordingly, when vertical, longitudinal, and left-right directions are used in the following explanation, they refer to the vertical of the vehicle vertical direction, the longitudinal of the vehicle longitudinal direction, and the left and the right of the vehicle left-right direction (the vehicle transverse direction), unless otherwise specified.

Figure 1:
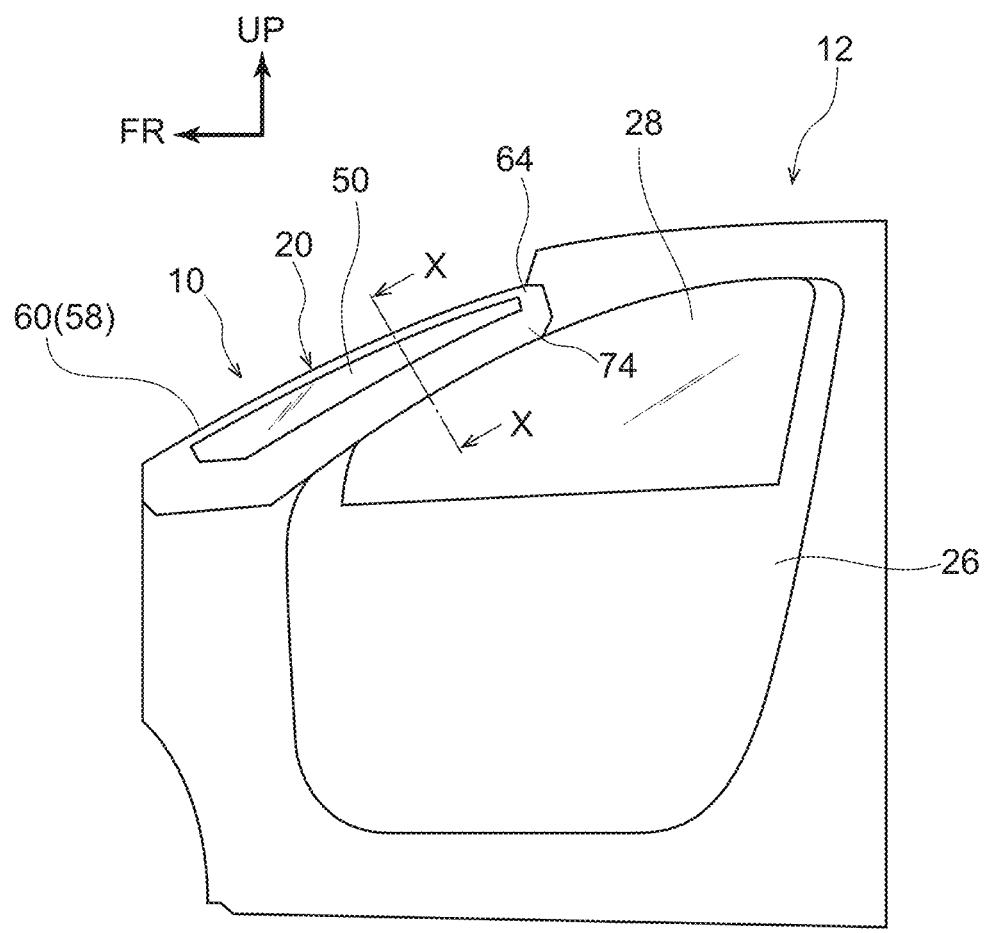
FIG. 1 is a side view showing an A pillar that has a front pillar structure relating to a present embodiment.
Figure 2:
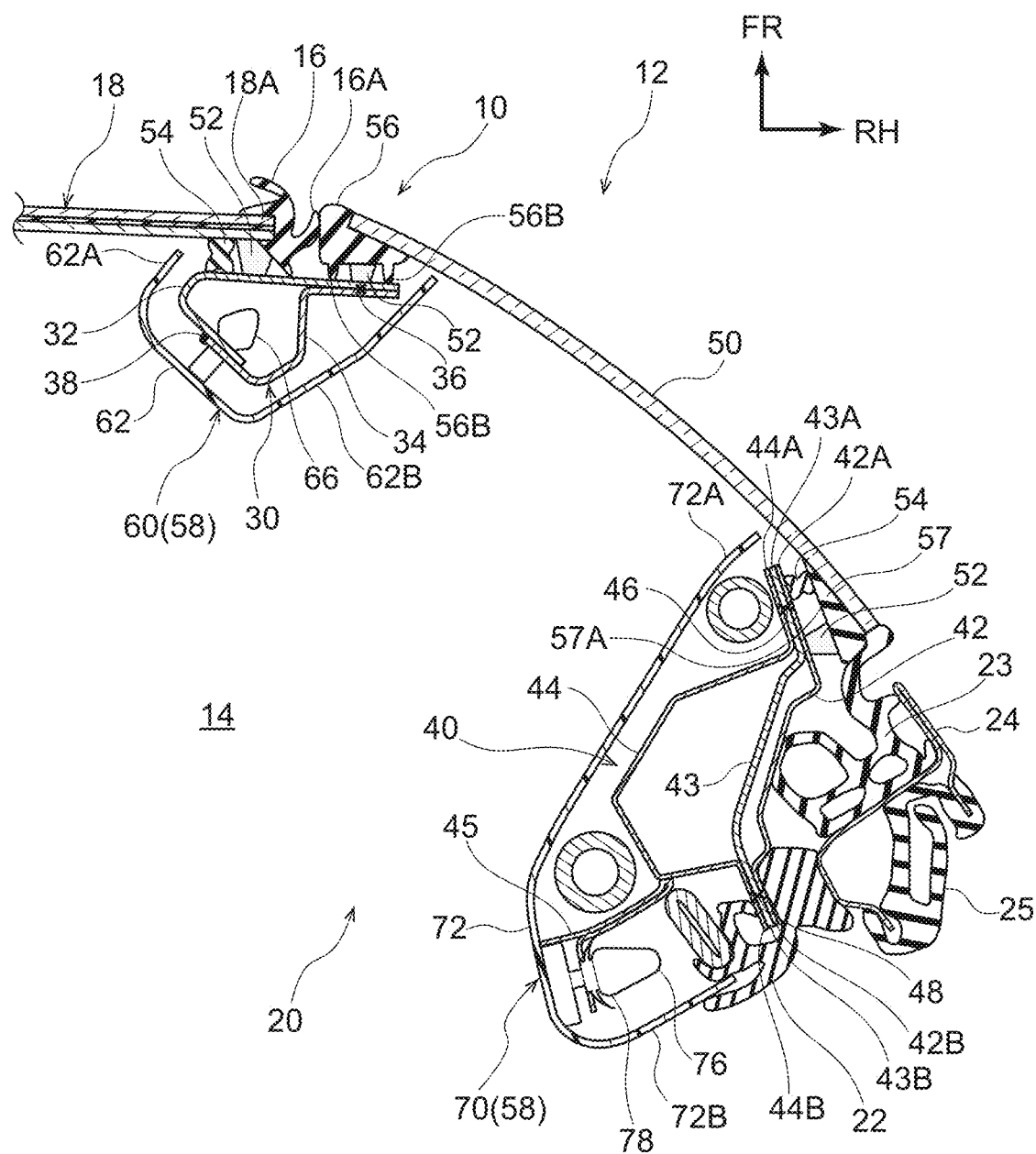
FIG. 2 is a cross-sectional view seen in the direction of arrow X-X of FIG. 1 and showing the front pillar structure relating to the present embodiment.

As shown in FIG. 2, a front windshield glass (hereinafter called "front glass") 18, which is inclined toward the vehicle rear side while heading toward the vehicle upper side and separates an inner side of a vehicle cabin 14 and an outer side of the vehicle cabin 14, is provided at a vehicle 12. Further, as shown in FIG. 1, a pair of left and right front pillars (hereinafter called "A pillars") 20, to which a front pillar structure 10 relating to the present embodiment is applied, are provided at the vehicle transverse direction outer sides of the front glass 18 and at the vehicle front sides of front side windows 28 of front doors 26.

Each of the pair of left and right A pillars 20 extends along a vehicle transverse direction outer side end portion 18A of the front glass 18 (see FIG. 2) with the length direction thereof being the substantially vehicle vertical direction. Namely, the pair of left and right A pillars 20 are respectively inclined toward the vehicle rear side while heading toward the vehicle upper side. Note that, because the A pillars 20 have the same structures but are symmetrical at the left side (e.g., the front passenger's seat side) and the right side (e.g., the driver's seat side), the A pillar 20 that is at the right side is described hereinafter.

As shown in FIG. 2, the A pillar 20 has a front column 30 that serves as a front side pillar frame member, and a rear column 40 that serves as a rear side pillar frame member. The front column 30 extends substantially along the vehicle vertical direction, and is structured to include a front side pillar outer panel 32 that is made of a steel plate and a front side pillar inner panel 34 that is made of a steel plate.

Figure 3:
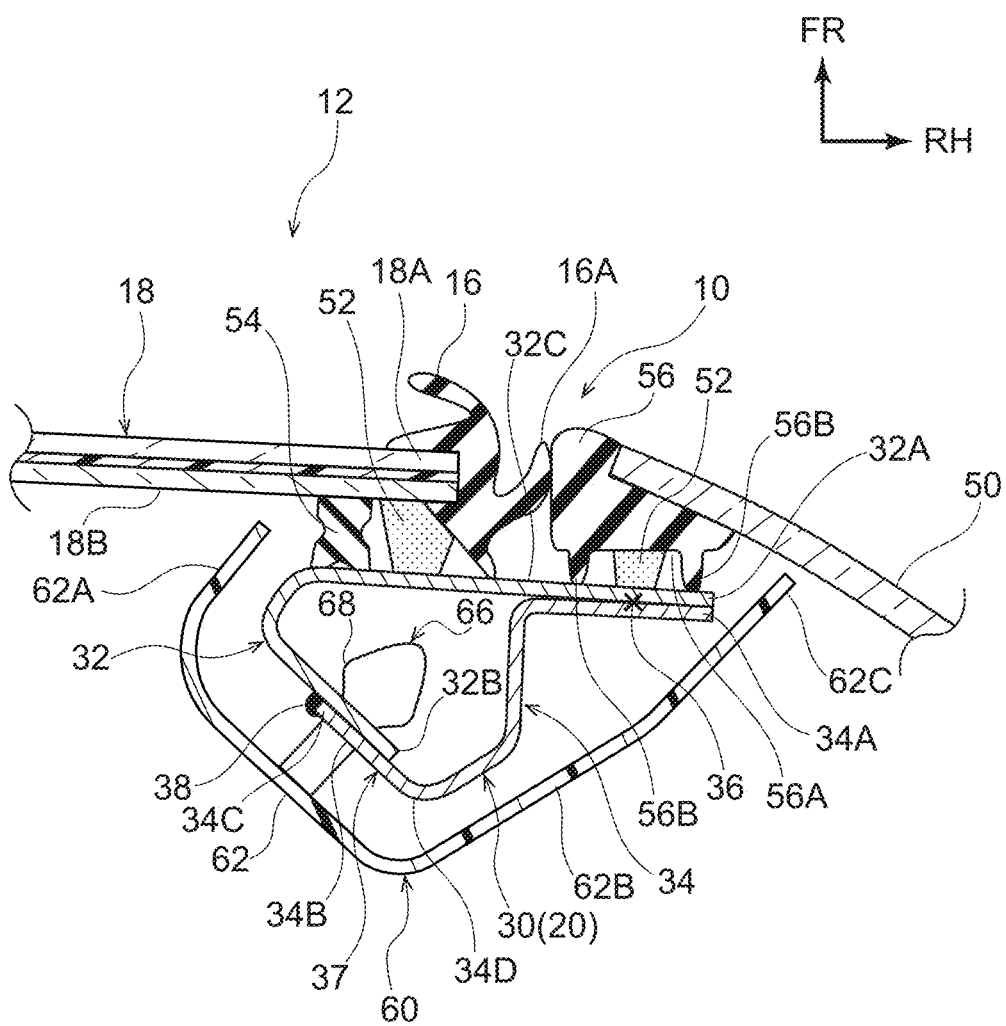
FIG. 3 is a partial enlarged sectional view of FIG. 2, and shows the front pillar structure relating to the present embodiment.

As shown in FIG. 3, the cross-sectional shape, which is orthogonal to the length direction (the direction of extending along the substantially vehicle vertical direction) of the front side pillar outer panel 32 is formed in a substantial C-shape. The cross-sectional shape, which is orthogonal to the length direction (the direction of extending along the substantially vehicle vertical direction), of the front side pillar inner panel 34 is formed in a substantial S-shape. Note that a ridgeline portion (corner portion) 34D that runs along the length direction is formed at the vehicle rear side of the front side pillar inner panel 34.

A closed cross-sectional shape is formed by the front side pillar outer panel 32 and the front side pillar inner panel 34. Namely, the front side pillar inner panel 34 is provided so as to face the substantially vehicle rear side of the front side pillar outer panel 32, and the front side pillar outer panel 32 and the front side pillar inner panel 34 are joined by spot welding or linear welding.

In further detail, an outer side flange portion 32A that is the vehicle transverse direction outer side end portion of the front side pillar outer panel 32, and an outer side flange portion 34A that is the vehicle transverse direction outer side end portion of the front side pillar inner panel 34, are superposed on one another, and this superposed portion is spot welded. Namely, plural spot welded portions 36 are formed at the outer side flange portion 32A and the outer side flange portion 34A at a predetermined interval in the length directions thereof.

On the other hand, an inner side flange portion 32B, which is the vehicle transverse direction inner side end portion and faces toward the vehicle cabin 14 side, of the front side pillar outer panel 32, and an inner side flange portion 34B, which is the vehicle transverse direction inner side end portion and faces toward the vehicle cabin 14 side, of the front side pillar inner panel 34, are superposed on one another, and this superposed portion is superposed portion 37.

An edge end portion 34C of the inner side flange portion 34B is welded in a linear form to the inner side flange portion 32B. Namely, plural linearly welded portions 38 are formed at the inner side flange portion 32B and the inner side flange portion 34B at a predetermined interval in the length directions thereof. Note that arc welding, laser welding and the like are examples of the means for welding the inner side flange portion 32B and the inner side flange portion 34B in a linear form.

Further, as shown in FIG. 3, the vehicle transverse direction outer side end portion 18A of the front glass 18 is joined to the front column 30 via a urethane adhesive 52 and a cushioning rubber 54. In further detail, a planar portion 32C that faces toward the vehicle front side is formed at the front side pillar outer panel 32 that structures the front column 30, and the outer side flange portion 32A is continuous with the vehicle transverse direction outer side of the planar portion 32C so as to be flush therewith. Namely, the outer side flange portion 32A is a portion of the planar portion 32C. Accordingly, the "planar portion 32C" hereinafter also includes the outer side flange portion 32A.

On the other hand, the urethane adhesive 52 is provided at an inner surface 18B that faces the vehicle cabin 14 side at the vehicle transverse direction outer side end portion 18A of the front glass 18. The cushioning rubber 54 for positioning is provided adjacent to the urethane adhesive 52 at a portion of the inner surface 18B that is further toward the vehicle transverse direction inner side than the urethane adhesive 52. Accordingly, the vehicle transverse direction outer side end portion 18A of the front glass 18 is joined to the planar portion 32C of the front side pillar outer panel 32 from the vehicle front side by the urethane adhesive 52 while being positioned by the cushioning rubber 54.

As shown in FIG. 2, the rear column 40 is disposed substantially at the vehicle rear side of the front column 30. In other words, the rear column 40 is disposed so as to be apart from the front column 30 by a predetermined interval in the substantially vehicle longitudinal direction. The rear column 40 extends substantially parallel to the front column 30 (substantially along the vehicle vertical direction).

The rear column 40 is structured to include a rear side pillar outer panel 42 that is made of a steel plate, a rear side pillar reinforcement 43 that is made of a steel plate, and a rear side pillar inner panel 44 that is made of a steel plate. The rear side pillar outer panel 42 and the rear side pillar reinforcement 43 are formed substantially in the shapes of flat plates. The cross-sectional shape, which is orthogonal to the length direction (the extending direction that runs substantially along the vehicle vertical direction) of the rear side pillar inner panel 44 is formed in a substantial hat shape.

A closed cross-sectional shape is formed by the rear side pillar outer panel 42, the rear side pillar reinforcement 43 and the rear side pillar inner panel 44. Namely, the rear side pillar reinforcement 43 and the rear side pillar inner panel 44 are provided so as to face one another at the substantially vehicle transverse direction inner side of the rear side pillar outer panel 42. The rear side pillar outer panel 42, the rear side pillar reinforcement 43 and the rear side pillar inner panel 44 are joined by spot welding.

In further detail, a front side flange portion 42A that is the vehicle front side end portion of the rear side pillar outer panel 42, a front side flange portion 43A that is the vehicle front side end portion of the rear side pillar reinforcement 43, and a front side flange portion 44A that is the vehicle front side end portion of the rear side pillar inner panel 44 are superposed on one another, and this superposed portion is spot welded. Namely, plural spot welded portions 46 are formed at the front side flange portion 42A, the front side flange portion 43A and the front side flange portion 44A at a predetermined interval along the length directions thereof.

Further, a rear side flange portion 42B that is the vehicle rear side end portion of the rear side pillar outer panel 42, a rear side flange portion 43B that is the vehicle rear side end portion of the rear side pillar reinforcement 43, and a rear side flange portion 44B that is the vehicle rear side end portion of the rear side pillar inner panel 44 are superposed on one another, and this superposed portion is spot welded. Namely, plural spot welded portions 48 are formed as well at the rear side flange portion 42B, the rear side flange portion 43B and the rear side flange portion 44B at a predetermined interval along the length directions thereof. Note that an opening weatherstrip 22 that is made of resin (made of rubber) is mounted, by being fit-together substantially from the vehicle rear side, with the rear side flange portion 42B, the rear side flange portion 43B and the rear side flange portion 44B that are superposed together.

An A pillar glass 50 that serves as a transparent member extends between the front column 30 and the rear column 40 via pillar glass moldings 56, 57 that are described later, the cushioning rubbers 54 and the urethane adhesives 52. Note that the A pillar glass 50 is a window member that is transparent and whose plate thickness direction is the substantially vehicle transverse direction, and is inclined toward the vehicle rear side while heading toward the vehicle upper side as seen in a side view (see FIG. 1).

As shown in FIG. 3, the pillar glass molding 56, which is made of resin (made of rubber) and serves as an angle absorbing member and is, as seen in a plan view, substantially shaped as a right triangle whose right angle portion is disposed at the vehicle transverse direction inner side and the vehicle rear side, is mounted integrally to the front end portion of the A pillar glass 50. Projecting portions 56B that serve as positioning portions are formed integrally with the left and right both sides of a wall surface 56A, which faces the vehicle cabin 14 side, of the pillar glass molding 56. The urethane adhesive 52 is mounted between the projecting portions 56B.

As shown in FIG. 2, the pillar glass molding 57, which is made of resin (made of rubber) and is, as seen in a plan view, substantially shaped as a right triangle whose right angle portion is disposed at the vehicle transverse direction outer side and the vehicle rear side, is mounted integrally to the rear end portion of the A pillar glass 50. The urethane adhesive 52 is mounted to the vehicle rear side of a wall surface 57A, which faces the vehicle cabin 14 side, of the pillar glass molding 57. The cushioning rubber 54 is mounted to the vehicle front side of this wall surface 57A.

Accordingly, the front end portion of the A pillar glass 50 is mounted to the front column 30 due to the pillar glass molding 56 being joined by the urethane adhesive 52 to the outer side flange portion 32A (the planar portion 32C) from the vehicle front side while being positioned by the projecting portions 56B. Then, the rear end portion of the A pillar glass 50 is mounted to the rear column 40 due to the pillar glass molding 57 being joined by the urethane adhesive 52 to the front side flange portion 42A from the vehicle transverse direction outer side while being positioned by the cushioning rubber 54.

As shown in FIG. 2 and FIG. 3, a molding 16 that is made of resin (made of rubber) and serves as a sealing member is provided at the vehicle transverse direction outer side end portion 18A of the front glass 18 by being fit-together therewith from the vehicle transverse direction outer side. A vehicle transverse direction outer side end portion 16A of this molding 16 is made to abut the pillar glass molding 56 in an elastically deformed state (at a predetermined pressure). Namely, rainwater and the like are prevented from penetrating-in between the A pillar glass 50 and the front glass 18 by the molding 16 that is provided between the pillar glass molding 56 and the vehicle transverse direction outer side end portion 18A of the front glass 18.

As shown in FIG. 2, a door frame 24 of the front door 26 is disposed at the vehicle transverse direction outer side of the rear side pillar outer panel 42. A door weatherstrip 23 is provided at the vehicle front side of the door frame 24. A glass run 25 is provided at the vehicle rear side of the door frame 24. Note that the A pillar glass 50 is not limited to glass, and may be structured by, for example, a fiber reinforced resin that is transparent, or the like.

As shown in FIG. 2 and FIG. 3, an A pillar garnish 58 is provided at the vehicle transverse direction inner sides of the front column 30 and the rear column 40. The A pillar garnish 58 is made of resin, and is structured to include a front side pillar garnish 60 that is provided at the vehicle cabin 14 side of the front column 30, and a rear side pillar garnish 70 that is provided at the vehicle cabin 14 side of the rear column 40.

The front side pillar garnish 60 has a main body portion 62 that extends substantially in the vehicle vertical direction along the front column 30, and an extension portion 64 (see FIG. 1) that is provided integrally with the upper end portion of the main body portion 62 and extends substantially toward the vehicle rear side. The lower end portion of the main body portion 62 is inserted in an insertion hole (not shown) that is formed in an instrument panel (not shown), and the upper end portion of the extension portion 64 abuts a roof head liner (not shown).

As shown in FIG. 3, the cross-sectional shape, orthogonal to the length direction (i.e., as seen in a plan sectional view), of the main body portion 62 of the front side pillar garnish 60 is formed in a substantial U-shape that opens substantially toward the vehicle transverse direction outer side. The main body portion 62 covers, from the vehicle cabin 14 side and in a non-contacting state, the front column 30 (the inner side flange portion 32B of the front side pillar outer panel 32, the inner side flange portion 34B of the front side pillar inner panel 34, and the outer side flange portions 32A, 34A).

Note that, in the plan sectional view shown in FIG. 3, a side wall portion 62B, which is at the rear side and faces the front side pillar inner panel 34, of the main body portion 62 is formed to be longer than a side wall portion 62A which is at the front side and faces the front side pillar outer panel 32.

A distal end portion 62C of the side wall portion 62B is bent slightly toward the vehicle front side.

Figure 4:
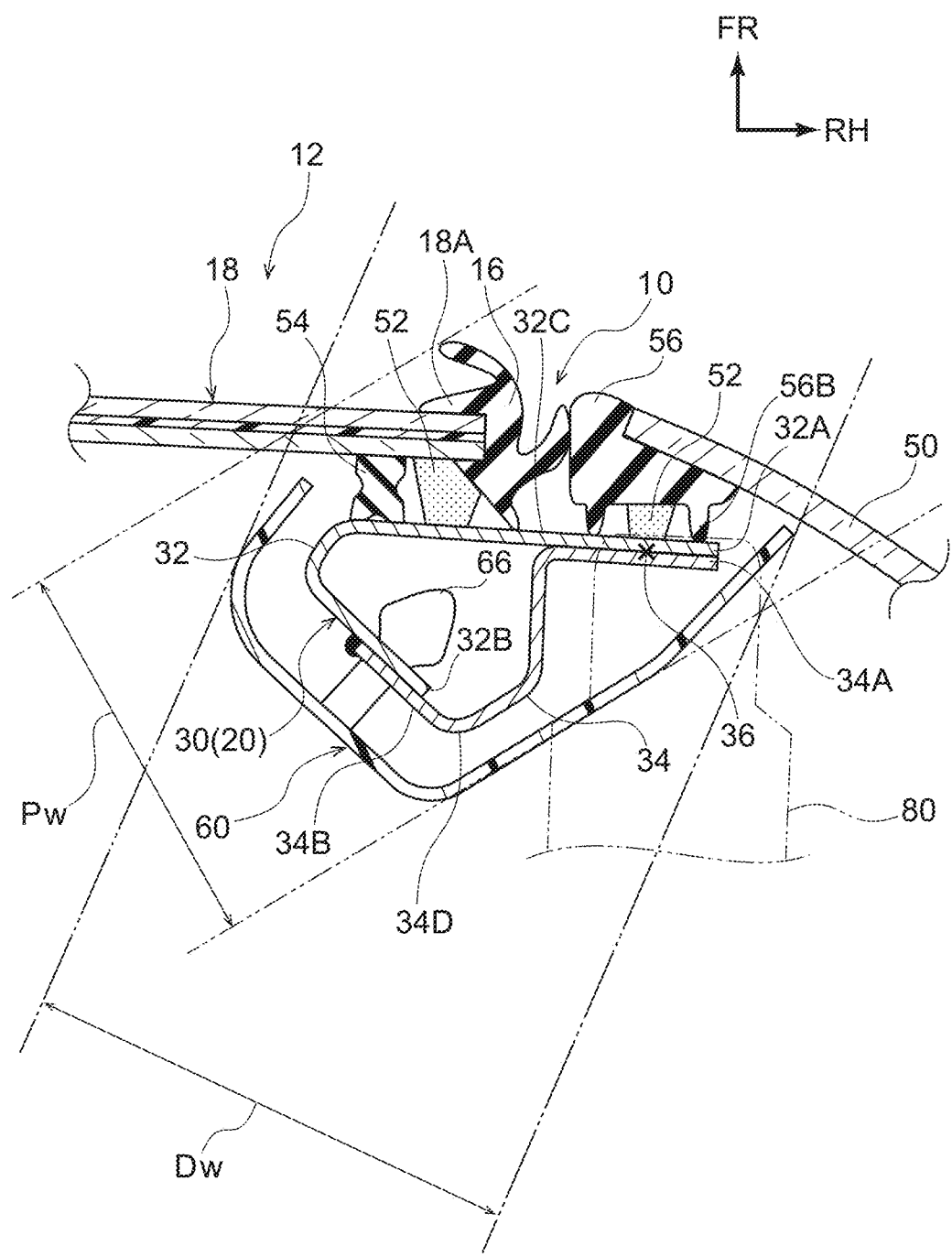
FIG. 4 is a cross-sectional view that corresponds to FIG. 3 and is for explaining operation of the front pillar structure relating to the present embodiment.

Namely, the distal end portion 62C of the side wall portion 62B is disposed so as to be adjacent to the outer side flange portion 32A and the outer side flange portion 34A. Due thereto, as shown in FIG. 4, dead angle Dw, which arises due to the front side pillar garnish 60 when viewing from the driver's seat, is less than or equal to a distance between the centers of the pupils. Moreover, dead angle Pw, which arises due to the front side pillar garnish 60 when viewing from the front passenger's seat side, also is less than or equal to the distance between the centers of the pupils.

Note that "distance between the centers of the pupils" is the distance between the center of the pupil of the right eye and the center of the pupil of the left eye of the driver who is seated in a seat (not shown), and, for example, is approximately 60 to 65 mm for a Japanese adult. In the present embodiment, the distance between the centers of the pupils is set to "65 mm" as an example.

Further, plural clips 66, which are substantially shaped as arrows and which have enlarged diameter portions 68 at the distal end sides thereof, are provided at the inner surface of the main body portion 62 along the length direction of the main body portion 62 with a predetermined interval therebetween. These clips 66 (enlarged diameter portions 68) are formed so as to be able to deform elastically in directions orthogonal to the projecting directions thereof, and are provided at the inner surface of the main body portion 62 so as to project-out so as to be able to face the inner side flange portion 34B of the front side pillar inner panel 34 and the inner side flange portion 32B of the front side pillar outer panel 32.

Further, through-holes (not illustrated), which communicate the inner side flange portion 34B and the inner side flange portion 32B that structure the superposed portion 37, are formed in the inner side flange portions 34B, 32B. The inner diameters of the through-holes are formed to be slightly smaller than the outer diameters of the enlarged diameter portions 68. Accordingly, the front side pillar garnish 60 is mounted to the front column 30 due to the enlarged diameter portions 68 of the clips 66 being inserted in the through-holes while being elastically deformed, and thereafter, the enlarged diameter portions 68 being restored.

As shown in FIG. 2, the rear side pillar garnish 70 has a main body portion 72 that extends substantially in the vehicle vertical direction along the rear column 40, and an extension portion 74 (see FIG. 1) that is provided integrally with the upper end portion of the main body portion 72 and extends substantially toward the vehicle rear side. In the same way as at the front side pillar garnish 60, the lower end portion of the main body portion 72 is inserted in an insertion hole that is formed in the instrument panel, and the upper end portion of the extension portion 74 abuts the roof head liner.

The cross-sectional shape, orthogonal to the length direction (i.e., as seen in a plan sectional view), of the main body portion 72 of the rear side pillar garnish 70 is formed in a substantial U-shape that opens substantially toward the vehicle transverse direction outer side. The main body portion 72 covers the rear column 40 from the vehicle cabin 14 side and in a non-contacting state. Note that, in the plan sectional view shown in FIG. 2, a side wall portion 72A, which is at the front side and faces the rear side pillar inner panel 44, of the main body portion 72 is formed to be longer than a side wall portion 72B that is at the rear side.

Further, plural clips 76, which are substantially shaped as arrows and which have enlarged diameter portions 78 at the distal end sides thereof, are provided at the inner surface of the rear side pillar garnish 70 along the length direction of the main body portion 72 with a predetermined interval therebetween. These clips 76 (enlarged diameter portions 78) also are formed so as to be able to deform elastically in directions orthogonal to the projecting directions thereof, and are provided at the inner surface of the main body portion 72 so as to project-out so as to be able to face a supporting portion 45 that is provided integrally with the rear side pillar inner panel 44.

Through-holes (not illustrated), which are slightly smaller than the outer diameters of the enlarged diameter portions 78, are formed in the supporting portion 45 that is provided integrally with the rear side pillar inner panel 44. Accordingly, the rear side pillar garnish 70 is mounted to the rear column 40 due to the enlarged diameter portions 78 of the clips 76 being inserted in the through-holes while being elastically deformed, and thereafter, the enlarged diameter portions 78 being restored.

Operation of the front pillar structure 10, which relates to the present embodiment and is structured as described above, is described next.

Figure 5:
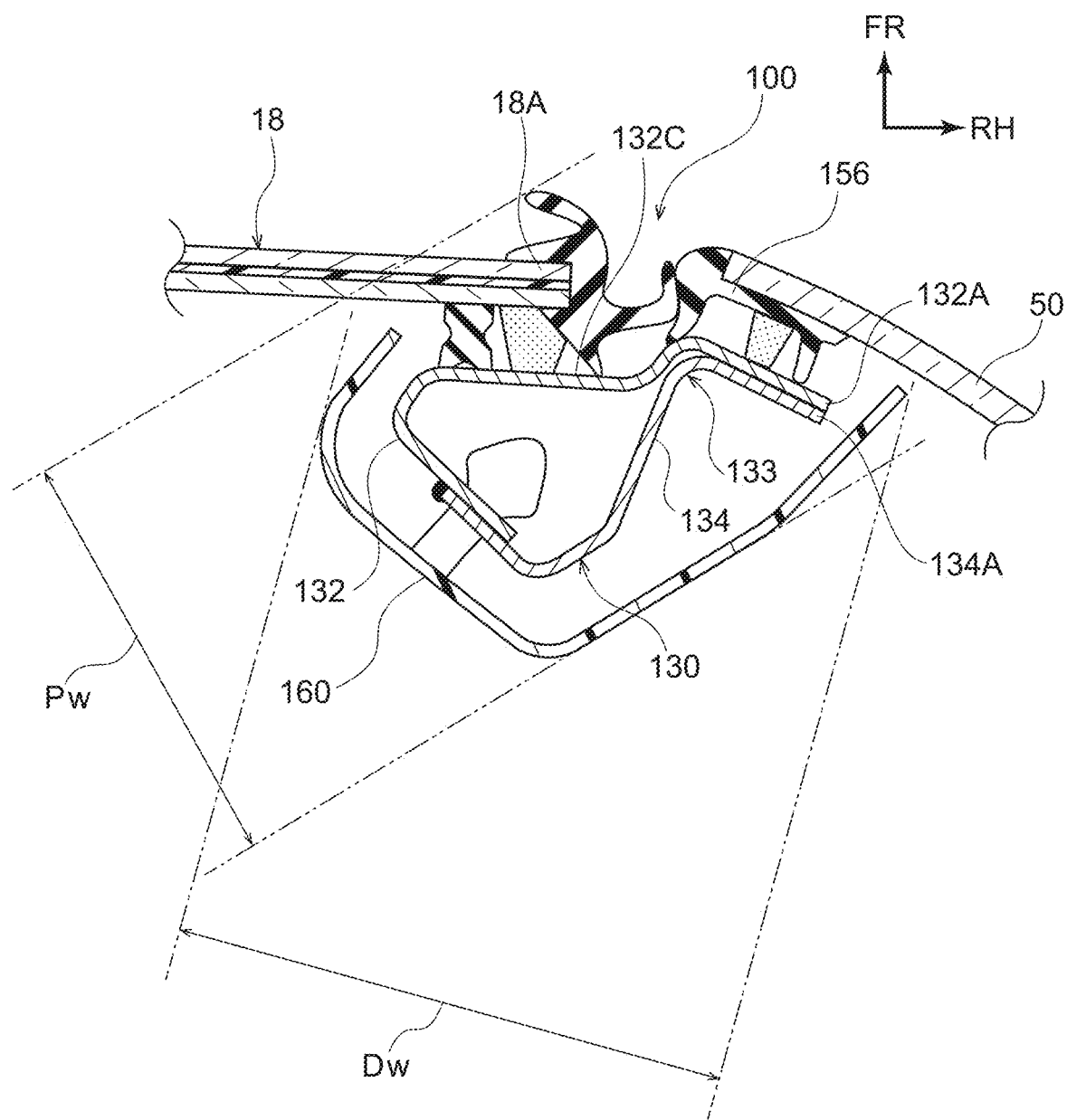
FIG. 5 is a cross-sectional view that corresponds to FIG. 3 and shows a front pillar structure relating to a comparative example.

First, a front pillar structure 100, which relates to a comparative example and is illustrated in FIG. 5, is described. As shown in FIG. 5, at this front pillar structure 100, a pillar glass molding 156 that is substantially flat-plate-shaped is provided at the front end portion of the A pillar glass 50. Therefore, an outer side flange portion 132A at a front side pillar outer panel 132 and an outer side flange portion 134A at a rear side pillar inner panel 134 of a front column 130 are disposed so as to be bent so as to face substantially toward the vehicle transverse direction outer side.

Namely, as seen in a plan view, the outer side flange portions 132A, 134A extend, via a bent portion 133, toward the vehicle transverse direction outer side and the rear side from a planar portion 132C of the front side pillar outer panel 132 to which the vehicle transverse direction outer side end portion 18A of the front glass 18 is mounted, and the outer side flange portions 132A, 134A are disposed parallel to the front end portion of the A pillar glass 50.

Accordingly, the length of the front column 130 in the vehicle transverse direction becomes longer by an amount corresponding to the amount by which this bent portion 133 is formed, and the length of a front side pillar garnish 160 in the vehicle transverse direction also become longer. The dead angle Dw, which arises due to the front side pillar garnish 160 when viewing from the driver's seat, and the dead angle Pw, which arises due to the front side pillar garnish 160 when viewing from the front passenger's seat, increase.

In contrast, in the front pillar structure 10 relating to the present embodiment, as shown in FIG. 4, the front end portion of the A pillar glass 50 is mounted, from the vehicle front side and via the pillar glass molding 56, to the outer side flange portion 32A (the planar portion 32C) of the front side pillar outer panel 32. Namely, the vehicle transverse direction outer side end portion 18A of the front glass 18 and the front end portion (the pillar glass molding 56) of the A pillar glass 50 are respectively mounted by the urethane adhesives 52 to the same planar portion 32C which faces toward the vehicle front side.

Accordingly, as compared with the front pillar structure 100 relating to the comparative example in which the vehicle transverse direction outer side end portion 18A of the front glass 18 and the front end portion of the A pillar glass 50 are mounted to a surface that faces toward the vehicle front side and a surface that faces substantially toward the vehicle transverse direction outer side respectively, narrowing of the front column 30 can be devised, and, as a result, narrowing of the A pillar 20 can be devised.

Accordingly, the dead angles that arise due to the A pillar 20 can be reduced. Namely, the dead angle Dw, which arises due to the front side pillar garnish 60 when viewing from the driver's seat, and the dead angle Pw, which arises due to the front side pillar garnish 60 when viewing from the front passenger's seat, can be reduced well (can be made to be less than or equal to the distance between the centers of the pupils).

Further, the pillar glass molding 56 is formed, as seen in plan view, substantially in the shape of a right triangle whose right angle portion is disposed at the vehicle transverse direction inner side and the vehicle rear side. Therefore, even though the A pillar glass 50 is disposed along a direction intersecting the front glass 18 as seen in a plan view, the front end portion of the A pillar glass 50 can be mounted well to the outer side flange portion 32A (the planar portion 32C).

Further, the projecting portions 56B for positioning with respect to the outer side flange portion 32A (the planar portion 32C) are formed integrally with the wall surface 56A of the pillar glass molding 56. Accordingly, as compared with a structure in which a positioning member (e.g., the cushioning rubber 54) for positioning with respect to the outer side flange portion 32A (the planar portion 32C) is provided separately at the wall surface 56A of the pillar glass molding 56, the number of parts (the manufacturing cost) can be reduced, and the pillar glass molding 56 can be mounted precisely.

As seen in a plan sectional view, the front side pillar garnish 60 is formed in a substantial U-shape that opens toward the vehicle outer side. Therefore, as compared with a case in which the front side pillar garnish is not formed in a substantial U-shape that opens toward the vehicle outer side, narrowing of the front side pillar garnish 60 itself also can be devised. Accordingly, narrowing of the A pillar 20 can be devised.

Further, when load is applied to the A pillar 20 from the vehicle front side, the front column 30 starts to bendingly deform toward the vehicle rear side. However, the ridgeline portion 34D that extends in the length direction of the front side pillar inner panel 34 is disposed at the rear portion side that is the compressively deformed side of the front column 30. Accordingly, at the rear portion of the front column 30, there is yield strength with respect to the compressive deformation. Accordingly, this compressive deformation can be suppressed.

Further, the outer side flange portion 32A and the outer side flange portion 34A are joined by spot welding, and the outer side flange portion 32A and the outer side flange portion 34A are formed so as to jut-out toward the vehicle transverse direction outer side. Therefore, a space for inserting a welding gun 80 (see FIG. 4) can be easily ensured. Accordingly, the welding of the outer side flange portion 32A and the outer side flange portion 34A can be facilitated.

The inner side flange portion 32B and the inner side flange portion 34B are welded in a linear form (a structure that has the linearly welded portions 38), and the outer side flange portion 32A and the outer side flange portion 34A are joined by spot welding (a structure having the spot welded portions 36). Therefore, the amount of heat inputted to the front column 30 can be reduced, as compared with a case in which the outer side flange portion 32A and the outer side flange portion 34A are welded linearly. Accordingly, the occurrence of distortion by heating at the front column 30 can be suppressed or prevented.

Further, the A pillar 20 relating to the present embodiment has the A pillar glass 50 that is transparent. Therefore, the driver (vehicle occupant) can view the situation at the outer side of the A pillar 20 via the A pillar glass 50 from between the front side pillar garnish 60 (the front column 30) and the rear side pillar garnish 70 (the rear column 40).

Although the front pillar structure 10 relating to the present embodiment has been described on the basis of the drawings, the front pillar structure 10 relating to the present embodiment is not limited to the illustrated structure, and the design thereof can be changed appropriately within a scope that does depart from the gist of the present disclosure. For example, the projecting portions 56B for positioning that are formed at the pillar glass molding 56 are not limited to the illustrated two projecting portions, and there may be one or three projecting portions.

What is claimed is:

1. A front pillar structure, comprising:
a front side pillar frame member and a rear side pillar frame member that structure a front pillar that is disposed at an outer side, in a vehicle transverse direction, of a front windshield glass;
a transparent member that extends between the front side pillar frame member and the rear side pillar frame member, and that, as seen in a plan view, is disposed along a direction toward a vehicle inner side as the transparent member extends toward a vehicle front side;
a planar portion that is formed at the front side pillar frame member so as to face toward the vehicle front side, and to which an outer side end portion, in the vehicle transverse direction, of the front windshield glass is mounted from the vehicle front side; and
an angle absorbing member that is provided at the vehicle front side end portion of the transparent member, and that is mounted to the planar portion from the vehicle front side,
wherein the vehicle front side end portion of the transparent member is mounted, from the vehicle front side and via the angle absorbing member, to the planar portion.

2. A front pillar structure, comprising:
a front side pillar frame member and a rear side pillar frame member that structure a front pillar that is disposed at an outer side, in a vehicle transverse direction, of a front windshield glass;
a transparent member that extends between the front side pillar frame member and the rear side pillar frame member, and that, as seen in a plan view, is disposed along a direction toward a vehicle inner side as the transparent member extends toward a vehicle front side;
a planar portion that is formed at the front side pillar frame member so as to face toward the vehicle front side, and to which an outer side end portion, in the vehicle transverse direction, of the front windshield glass is mounted from the vehicle front side; and
an angle absorbing member that is provided at a vehicle front side end portion of the transparent member, and that is mounted to the planar portion from the vehicle front side,
wherein the angle absorbing member, as seen in a plan view, is formed substantially in a shape of a right triangle having a right angle portion that is disposed at an inner side, in the vehicle transverse direction, and at a vehicle rear side.

3. The front pillar structure of claim 1, wherein the angle absorbing member has a positioning portion for positioning with respect to the planar portion.

4. The front pillar structure of claim 3, wherein the positioning portion is a projecting portion.

5. The front pillar structure of claim 4, wherein a urethane adhesive is mounted between the projecting portions.

6. The front pillar structure of claim 1, wherein the vehicle front side end portion of the transparent member is in direct contact with the angle absorbing member.

7. The front pillar structure of claim 1, wherein the angle absorbing member has a portion arranged, in the vehicle transverse direction, between the front windshield glass and the transparent member.

8. The front pillar structure of claim 1, wherein the planar portion extends continuously in the vehicle transverse direction, and overlaps both the outer side end portion of the front windshield glass and the transparent member in a vehicle longitudinal direction.

9. The front pillar structure of claim 1, further comprising:
a sealing member which is fit to the outer side end portion of the front windshield glass and abuts the angle absorbing member in an elastically deformed state.

\* \* \* \* \*